Aug. 9, 1955
R. E. MATTER ET AL
2,715,165
ECCENTRIC TOLERANCE INDICATOR
Filed March 16, 1953
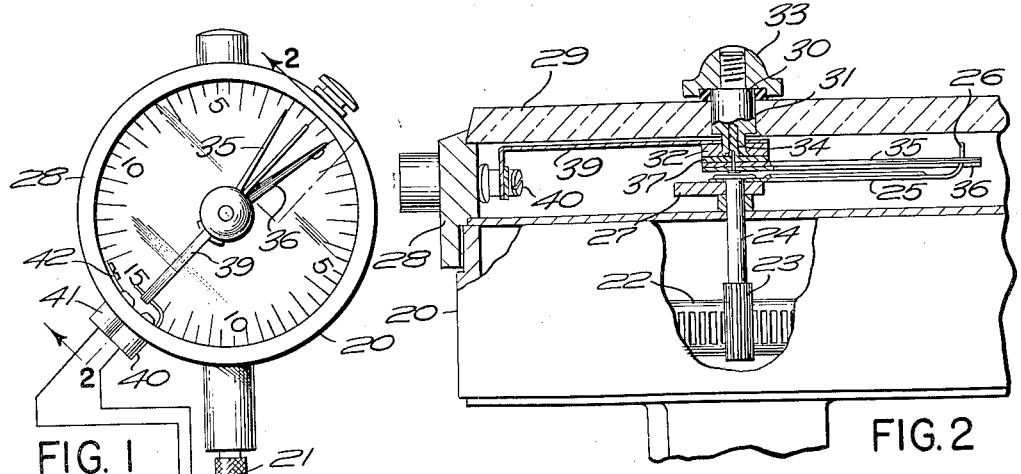
FIG. 1
FIG. 2
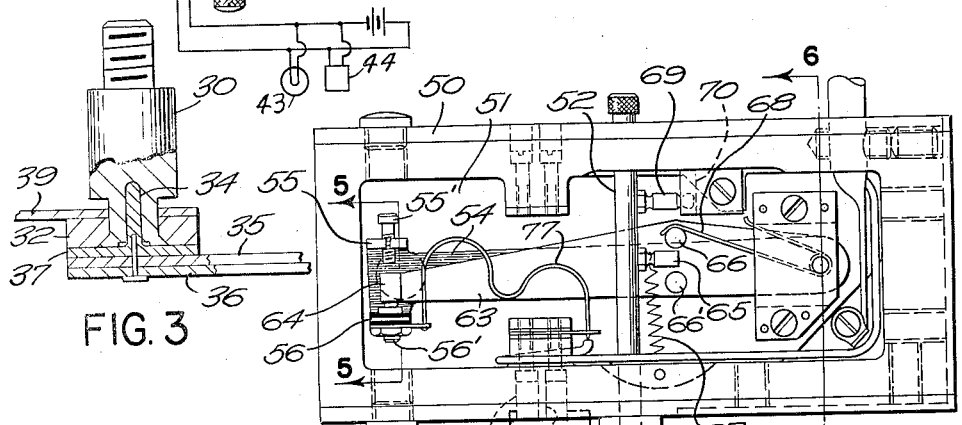
FIG. 3
FIG. 4
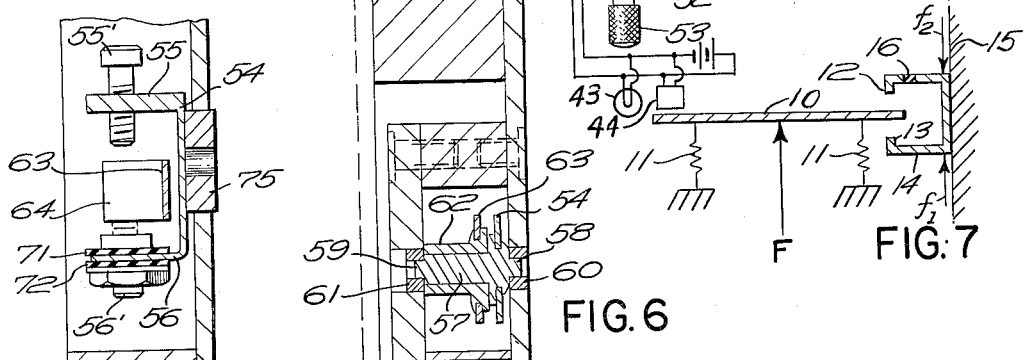
FIG. 5
FIG. 6
FIG. 7
*INVENTOR.*
ROGER E. MATTER
RAYMOND H. MILLER
BY
*Barlow & Barlow*
ATTORNEYS United States Patent Office 2,715,165
Patented Aug. 9, 1955

2,715,165

ECCENTRIC TOLERANCE INDICATOR

Roger E. Matter and Raymond H. Miller, Cranston, R. I., assignors to Federal Products Corporation, a corporation of Rhode Island Application March 16, 1953, Serial No. 342,396

10 Claims. (Cl. 200—61.41)

This invention relates to an eccentric tolerance indicator which is designed to be mounted on a machine tool and indicate whether the degree of eccentricity of the work is within a specified tolerance.

Normal run-out inspection technique has in the past utilized an ordinary dial indicator unit wherein the inspector places the indicator contact tip on the rotating work and notes the total travel of the dial indicator hand, which indicates in thousandths of an inch the total run-out of the rotating work. This is a rather tiring procedure, for it is necessary for the inspector to mentally note the minimum and maximum dial positions as seen on the indicator and interpret the difference. To add to the difficulty, it is generally not possible to set the indicator dial to zero when making this type of visual measurement, since there is a diameter tolerance involved in addition to the eccentric tolerance.

It is therefore one of the main objects of our invention to eliminate any effect on the eccentricity reading caused by the diameter tolerance.

Another object of our invention is to add to a visual indicator reading an audible signal when the eccentricity limit is exceeded.

A still further object of our invention is to provide an assemblage of parts which may be readily attached to existing dial indicator units that are normally utilized in making tolerance measurements.

A still further object of our invention is to provide an eccentricity indicator unit that may be readily adjusted to various tolerances as desired.

With these and other objects in view, the invention consists of certain novel features of construction as will be more fully described and particularly pointed out in the appended claims.

In the accompanying drawings:

Figure 1 is a top plan view of one of the forms of our invention;

Figure 2 is a sectional view taken on lines 2—2 of Figure 1;

Figure 3 is an enlarged sectional view taken from Figure 2 of the pointer mounting assembly;

Figure 4 is a top view with the cover removed of a second form of our invention;

Figure 5 is a sectional view taken on line 5—5 of Figure 4;

Figure 6 is a sectional view taken on line 6—6 of Figure 4; and

Figure 7 is a diagrammatic view illustrating the principle of operation of the general form of our invention.

In proceeding with this invention, we provide two spaced abutments which are frictionally mounted for movement on some support means. We additionally provide a movable arm that generally lies between the two abutments and which is connected through some operating rod or other means to the work which is to be measured for eccentricity. The arrangement is such that when the operating means coupled to the arm moves the arm, the arm will move toward one of the abutments and upon engagement will move the entire abutment assemblage to a new position which is that of maximum travel. The frictional engagement of the abutments with the support means will hold the abutments in place while the arm moves between the abutments in accordance with the eccentricity of the work being measured. The second abutment is preferably provided with a contact insulated from the first abutment so that should the arm move to engage this second abutment upon excessive eccentricity being measured, a circuit will be closed and a visual or audible signal or both will be actuated.

With reference to the drawings, more particularly Figure 7 thereof, there is shown an actuating means or lever arm 10 that is adapted to have a force F applied thereto. This force F acts against spring means 11. Additionally, there is shown two abutments 12 and 13 which are fixed to a common bracket 14. This bracket 14 frictionally engages a mounting means 15, the frictional components thereof noted as force arrows $f_1$ and $f_2$. When force F is applied to the actuating arm 10, the actuating arm will resistively move into engagement with abutment 12, sliding the mounting bracket 14 along mounting means 15 against the frictional force $f_2$. Since the amplitude of the force F represents the degree of eccentricity of a piece of rotating work, it will be alternately applied and released, thereby oscillating the actuating arm 10 between the abutments 12 and 13. Should the degree of eccentricity be in excess of a predetermined amount, which is preset by adjustment of the distance between abutments 12 and 13, the actuating arm 10 will engage the abutment 13 in addition to engaging the abutment 12. In practice abutment 13 represents an electrical contact member which is insulated from abutment 12 as at 16 and therefore when actuating arm 10 engages abutment 13, an electrical circuit will be completed between actuating arm 10 and abutment 13, the electrical circuit serving to energize some signaling device (not shown).

Referring now more particularly to Figures 1, 2, and 3, there is shown one embodiment of our invention which is adapted to be fixed to a standard dial indicator casing 20 provided with the usual work-contacting rod 21 coupled to a rack 22 which engages through a series of gears (not shown) a pinion 23 that is affixed to the lower end of a shaft 24 which carries an indicator pointer 25 with an upturned end 26 and a counterweight 27. The rod 21 is normally held in the extended position by means of a resilient bias (not shown). The gear train is such that the pointer will rotate clockwise upon retraction of the rod 21 and move in a counterclockwise direction upon movement of the rod to extended position. A bezel 28 is suitably mounted on the body 20 and carries a glass crystal 29. A stud 30 passes through a central hole 31 in the glass crystal 29 and has riveted thereto a magnet 32. The stud 30 is suitably held in position by a mounting knob 33 and has centrally bored in the other end thereof a hole 34 the axis of which is concentric to the axis of the shaft 24. A metallic tolerance hand 35 and a plastic tolerance hand 36 are riveted together at a specified angle and mounted upon a stud 37 to form a tolerance assembly, the stud passing into hole 34. The hands 35, 36 are arranged to straddle the upturned end 26 to be engaged thereby upon rotation of pointer 25, the hand 36 being at a position to be engaged upon a clockwise rotation of said pointer. The magnet 32 exerts the frictional force explained above by pulling the stud 37, which has low magnetic reluctance, into close contact therewith. Other means can be used to achieve this result, such as a coil spring, or press fitted parts, the magnetic force being preferred. The spread between the metal hand 35 and plastic hand 36 forms a tolerance zone, this zone being preset and equal to the specified limit for eccentricity. This zone may, of course, be adjusted or various sets of tolerance hands substituted for different ranges. An electrical lead 39 extends from the magnetic stud assembly 30 to an insulated terminal 40 and a second terminal 41, which is directly connected to the bezel and casing as at 42 and thence by metallic contact through the metal parts of the indicator to the hand 35, is mounted adjacent thereto.

In operation, the indicator is moved toward the work until the actuator rod 21 engages the work and moves the pointer 25 across the gap between the metal hand 35 and plastic hand 36. When the upturned end 26 of the indicator hand 25 touches the plastic hand 36, the tolerance assembly, consisting of indicator hands 35 and 36, is driven to a position corresponding to the maximum radius of the work encountered. Because of the magnetic attraction afforded by magnet 32 upon the metallic hand 35 and stud 37, the tolerance hands will remain in their position to which just driven, and during a further rotation of the work the indicator hand 25 will go minus an amount equal to the difference between the shortest and longest radius of the work with reference to the axis of rotation of the work being measured. The tolerance indicator hands being preset to form a specified tolerance zone, it will be seen that if the indicator hand 25 travels in the minus direction and touches the metal tolerance hand 35, the limit for eccentricity has been exceeded. When the indicator hand 25 touches the tolerance hand 35, an electrical circuit is completed between these two hands, which circuit is brought out to contacts 41 and 40 at the side of the bezel 28 and which can be suitably utilized to actuate some visual or audible indicating device, as for example a lamp 43 and a signalling device 44.

Referring now to the second embodiment of our invention shown in Figures 4, 5, and 6, there is shown a casing 50 provided with a central recess 51. Passing midway through the recess 51 is an actuator rod 52 having an enlarged end 53 for engagement with the work. Centrally disposed within the recess 51 is a metallic arm 54 that is provided at one end thereof with spaced abutments 55, 56 having adjusting screws 55', 56', respectively. Adjustment screws 55', 56' are threaded into the abutments 55 and 56, respectively, and provide a variable adjustment or tolerance zone for the travel of the enlarged end 64 of arm 63. The adjustment screw 56' serves as an electric contact and, therefore, is suitably insulated from the abutment 56 by the provision of an insulating bushing and fiber washers 71, 72 (Figure 5). A pivot stud 57 (Figure 6) having bearings 58 and 59 that are respectively received in bushings 60 and 61 pivotally relates arm 54 to the casing 50. A bushing 62 surrounds the stud 57 and mounts the second arm 63 which has an enlarged end 64 that lies between the two aforementioned abutments 55 and 56 of the arm 54.

An operating pin 65 (Figure 4) is affixed to the actuating rod 52 and engages two dowel pins 66—66' that are secured to arm 63 so as to transmit motion thereto. A spring 67 is attached to the pin 65 and the casing 50 to normally maintain the actuating rod 52 in an extended position. Additionally, a second coiled spring 68 engages the dowel pin 66 to normally maintain it in contact with the pin 65. To prevent any rotational movement of the actuating rod 52, a guide pin 69 is affixed thereto, which is adapted to slide in a slot 70.

Arm 54 is constructed out of a metallic material having a low magnetic reluctance and is adapted to remain in the position to which it is driven by means of a magnet 75. Magnet 75 (Figure 5) is of a size large enough to engage the arm 54 over the complete extent of its travel but has a strength that is insufficient to hold the arm 54 against the normal force exerted by arm 63. Other frictional means, of course, could be used, such as a felt pad, but it has been found the magnet lends itself more readily to this application and supplies a constant frictional resistance over a wide range of humidity and temperature, which could not be secured with other known elements.

In operation of this embodiment of our invention, the casing 50 is moved towards the work until the enlarged portion 53 of the actuator rod 52 engages the work. At this point the actuator rod 52 is moved inwardly and the pin 65 engages the dowel pin 66, which moves the arm 63, its enlarged end 64 moving across the gap between the abutments 56 and 55 to engage the abutment adjusting screw 55'. At this point the entire tolerance assembly including the arms 63 and 54 are driven to a position corresponding to the maximum radius of the work encountered. The tolerance arm 54 now remains at its driven position by action of the magnet 75, and during further rotation of the work the arm 63 will return toward the abutment 56 an amount equal to the difference between the shortest and longest radius of the work being measured with reference to the axis of rotation. If the eccentricity of the work exceeds a specified limit, the enlarged end 64 will travel towards the abutment 56 and engage the contact screw 56', indicating such over-travel and will thereby close an electrical circuit which is made between the contact screw 56' and the casing through the arm 63 and its associated metallic parts. The electrical circuit is brought out to contacts 74, 76, one of said contacts being connected through wire 77 to contact screw 56', the other being connected to the casing 50 and through the metal parts of the indicator to arm 63. A lamp 43 and an audible signal device may be connected to the contacts 74, 76.

In each of the embodiments of our invention the electrical terminals are connected to an external power unit that contains a signaling device as above described. The signal may take several forms but is preferably a visual light that will be illuminated upon over-travel, circuits being utilized that will maintain the light illuminated once a closed circuit condition has been established. Audible signals may alternately or in addition be utilized as above indicated.

We claim:

1. An eccentric tolerance indicator comprising mounting means, spaced abutments, means coupling said abutments a finite distance apart for simultaneous movement, said abutments movably mounted for frictional engagement with said mounting means, actuating means movably mounted between said abutments for engagement therewith, said actuating means adapted to move said abutments to a position to be held by said frictional engagement and oscillate therebetween, and indicating means responsive to excessive oscillation of said actuating means.

2. An eccentric tolerance indicator comprising a mounting plate, a first movable member adapted to be coupled to the work through an actuating rod, a second movable member and a third movable member, said second and third members being connected together for simultaneous movement to fix them a finite distance apart and frictionally mounted on said plate, said first member being mounted on said plate between said second and third members to engage said second member and move it in accordance with the initial displacement of said actuating rod, said second and third members being held in the displaced position by said frictional mounting, and indicating means responsive to excessive oscillation of said actuating means.

3. An eccentric tolerance indicator comprising a mounting plate, a first arm pivoted on said plate, said first arm having two spaced abutments, a second arm pivoted on said plate and having a portion thereof lying between said two abutments, an actuating rod coupled to said second arm and frictional means on said plate engaging said first arm, said second arm adapted to move said first arm to a position to be held by said frictional means and indicating means responsive to excessive oscillation of said second arm.

4. An indicator as in claim 3 wherein said abutments form electrical contacts, one abutment having a contact insulated from said first arm, said indicating means including a circuit across said insulated contact and said second arm.

5. An indicator as in claim 4 wherein said first arm consists of material having low magnetic reluctance and said frictional means comprises a magnet mounted on said plate along the path of movement of said first arm.

6. An eccentric tolerance indicator comprising a casing, first and second arms mounted on an axis in said casing for rotational movement therein, said first and second arms being joined together at their rotational axis and fixed at a finite angle to each other for simultaneous movement, a third arm mounted on said axis for rotational movement, said third arm having an upturned end and normally positioned between said first and second arms, an actuating rod coupled to said third arm and frictional means in said casing engaging said first and second arms, said third arm adapted to move said first and second arms to a position to be held by said frictional means and oscillate therebetween and indicating means responsive to excessive oscillation of said third arm.

7. An indicator as in claim 6 wherein said first and third arms are metallic and insulated from each other, and said second arm is non-metallic, said indicating means including a circuit across said first and third arms.

8. An indicator as in claim 6 wherein the metallic material has a low magnetic reluctance and said frictional means comprises a magnet mounted in said casing along the path of movement of said first arm.

9. An eccentric tolerance indicator comprising mounting means, spaced abutments, means coupling said abutments a finite distance apart for simultaneous movement, said abutments movably mounted for frictional engagement with said mounting means, actuating means movably mounted between said abutments for engagement therewith, said actuating means adapted to move said abutments to a position to be held by said frictional engagement and oscillate therebetween, and indicating means coupled to said actuating means and said abutments to indicate excessive oscillation.

10. An eccentric tolerance indicator comprising mounting means, spaced abutments, means coupling said abutments a finite distance apart for simultaneous movement, said abutments movably mounted for frictional engagement with said mounting means and insulated electrically one from the other, actuating means movably mounted between said abutments for engagement therewith, said actuating means adapted to move said abutments to a position to be held by said frictional engagement and oscillate therebetween, and indicating means connected between said actuating means and one abutment to indicate excessive oscillation of said actuating means.

References Cited in the file of this patent

UNITED STATES PATENTS

| 407,903 | Schlatter | July 30, 1889 |
| 739,126 | Vives | Sept. 15, 1903 |
| 898,643 | Haymond et al. | Sept. 15, 1908 |
| 1,136,407 | Carrigan | Apr. 20, 1915 |
| 2,171,183 | Lamb | Aug. 29, 1939 |
| 2,456,062 | Iwanski | Dec. 14, 1948 |
| 2,457,286 | Tollefsen | Dec. 28, 1948 |
| 2,605,736 | Cook | Aug. 5, 1952 |